Feb. 4, 1947.   T. B. GIBBS   2,415,206
MACHINE TOOL
Filed Dec. 7, 1942   10 Sheets-Sheet 1

INVENTOR.
Thomas B. Gibbs
BY
Richardson and Auer
Attys.

Feb. 4, 1947.    T. B. GIBBS    2,415,206
MACHINE TOOL
Filed Dec. 7, 1942    10 Sheets-Sheet 2

INVENTOR.
Thomas B. Gibbs
BY
Richardson and Auer
Attys.

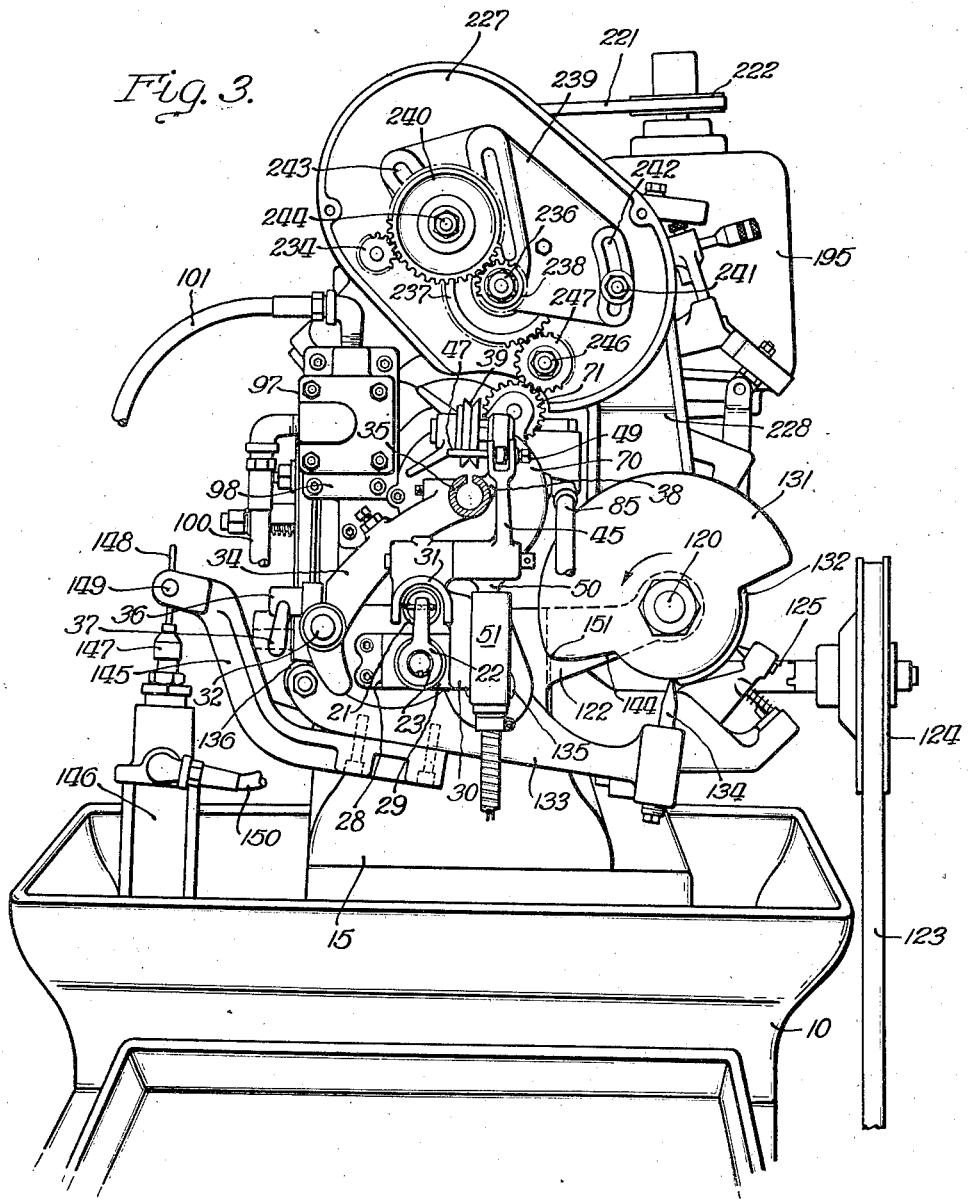

Feb. 4, 1947.  T. B. GIBBS  2,415,206
MACHINE TOOL
Filed Dec. 7, 1942  10 Sheets-Sheet 4

INVENTOR.
Thomas B. Gibbs
BY
Richardson and Auer
Attys.

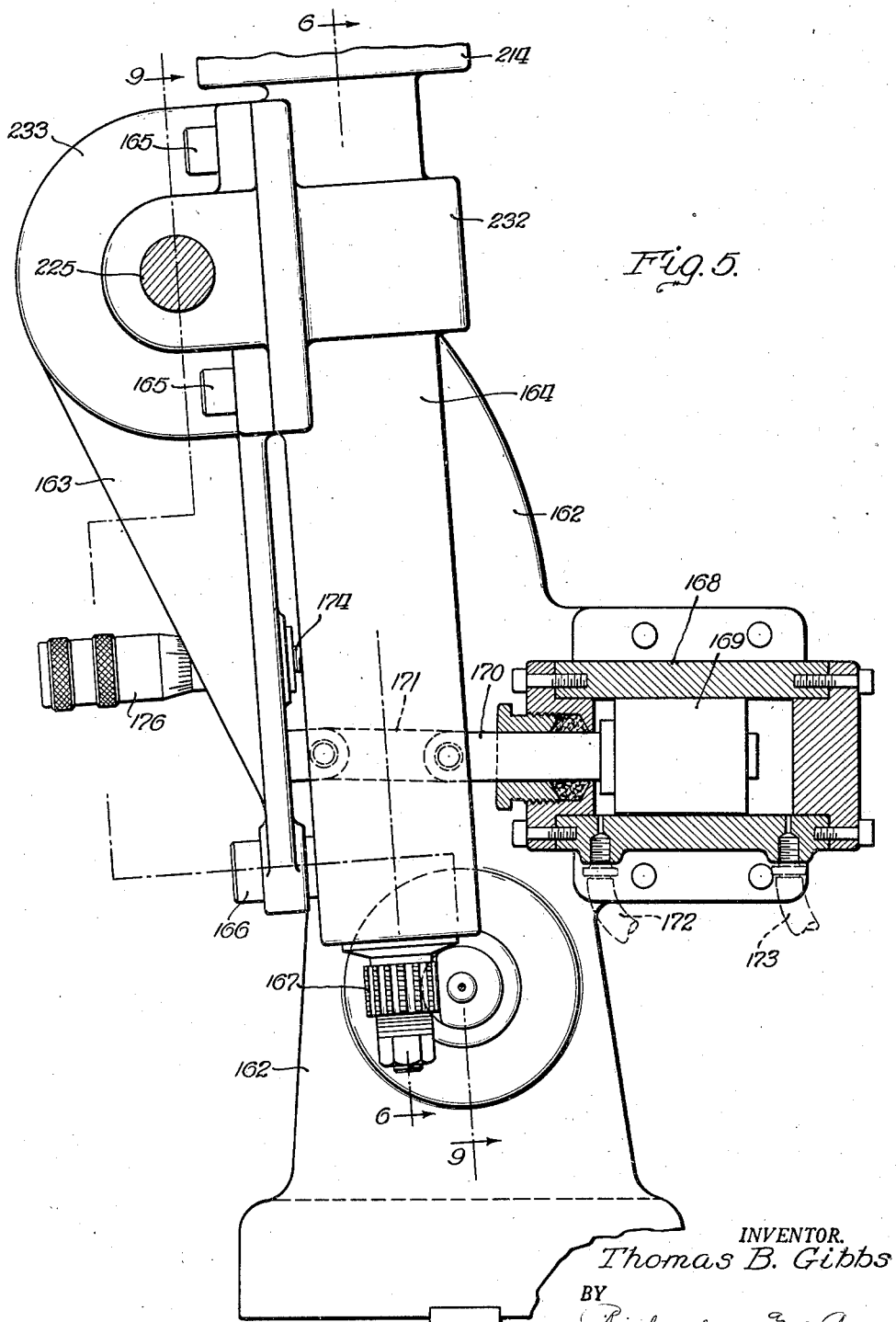

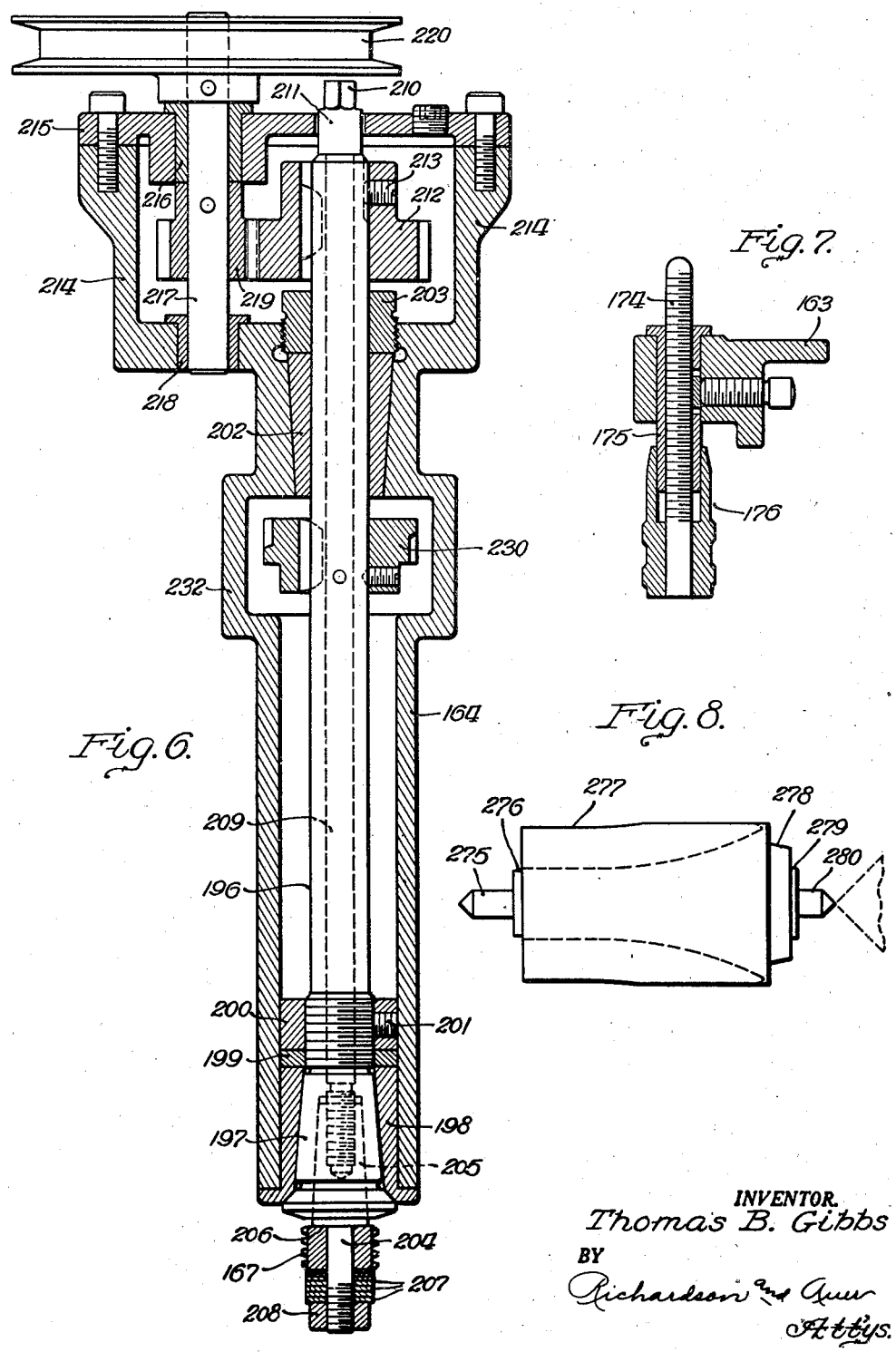

Feb. 4, 1947. T. B. GIBBS 2,415,206
MACHINE TOOL
Filed Dec. 7, 1942 10 Sheets-Sheet 7
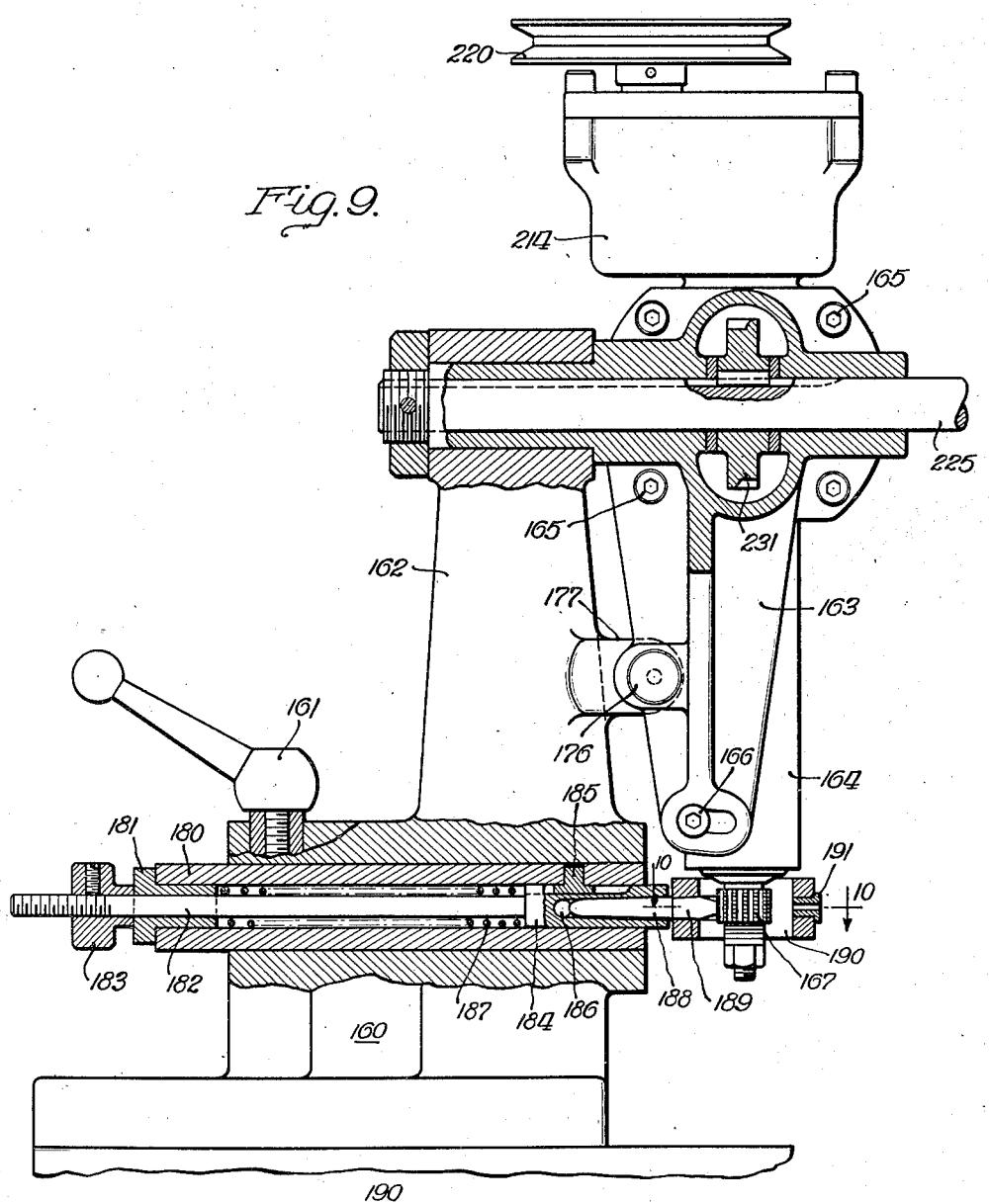
INVENTOR.
Thomas B. Gibbs
BY
Richardson and Auer
Attys.

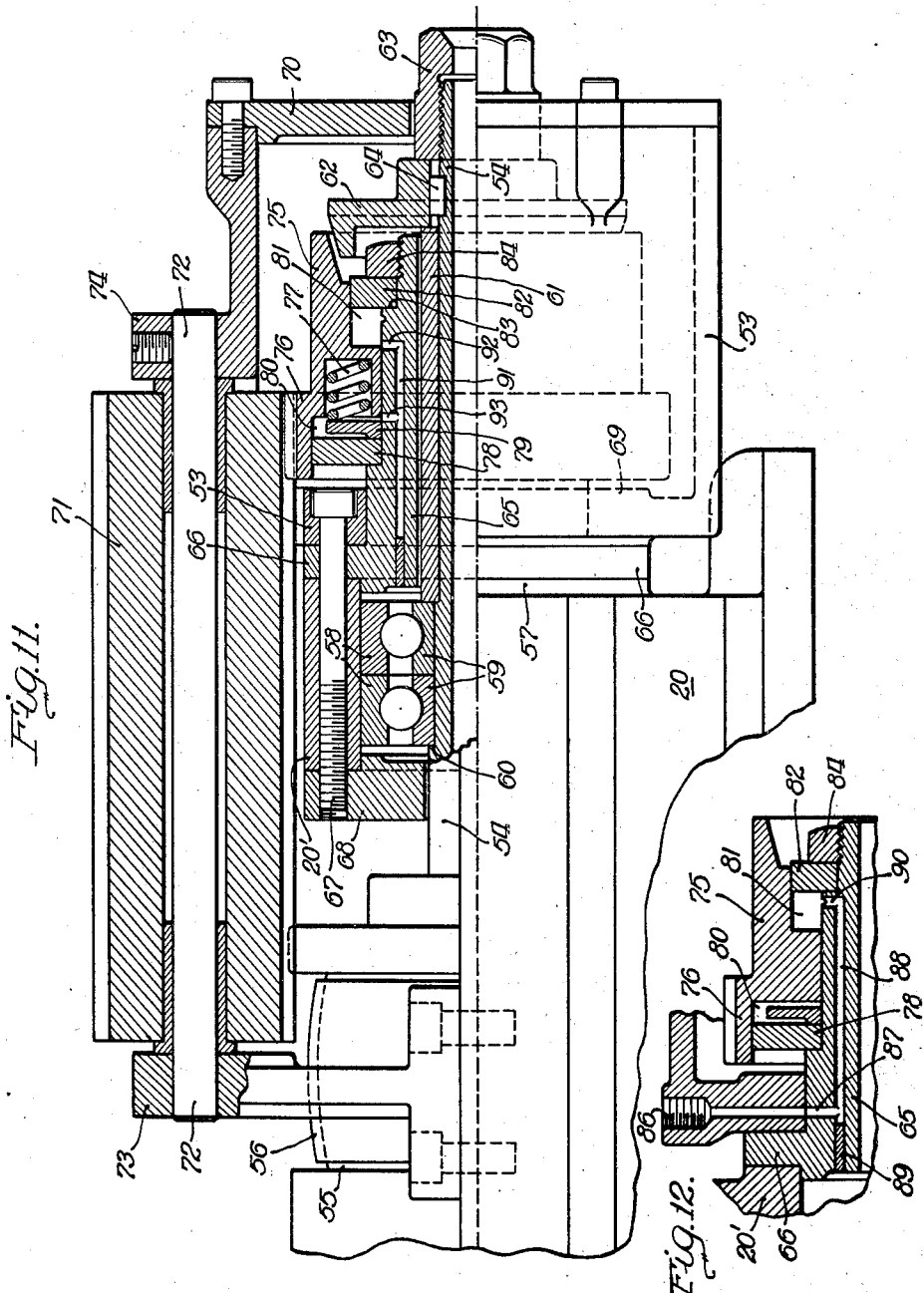

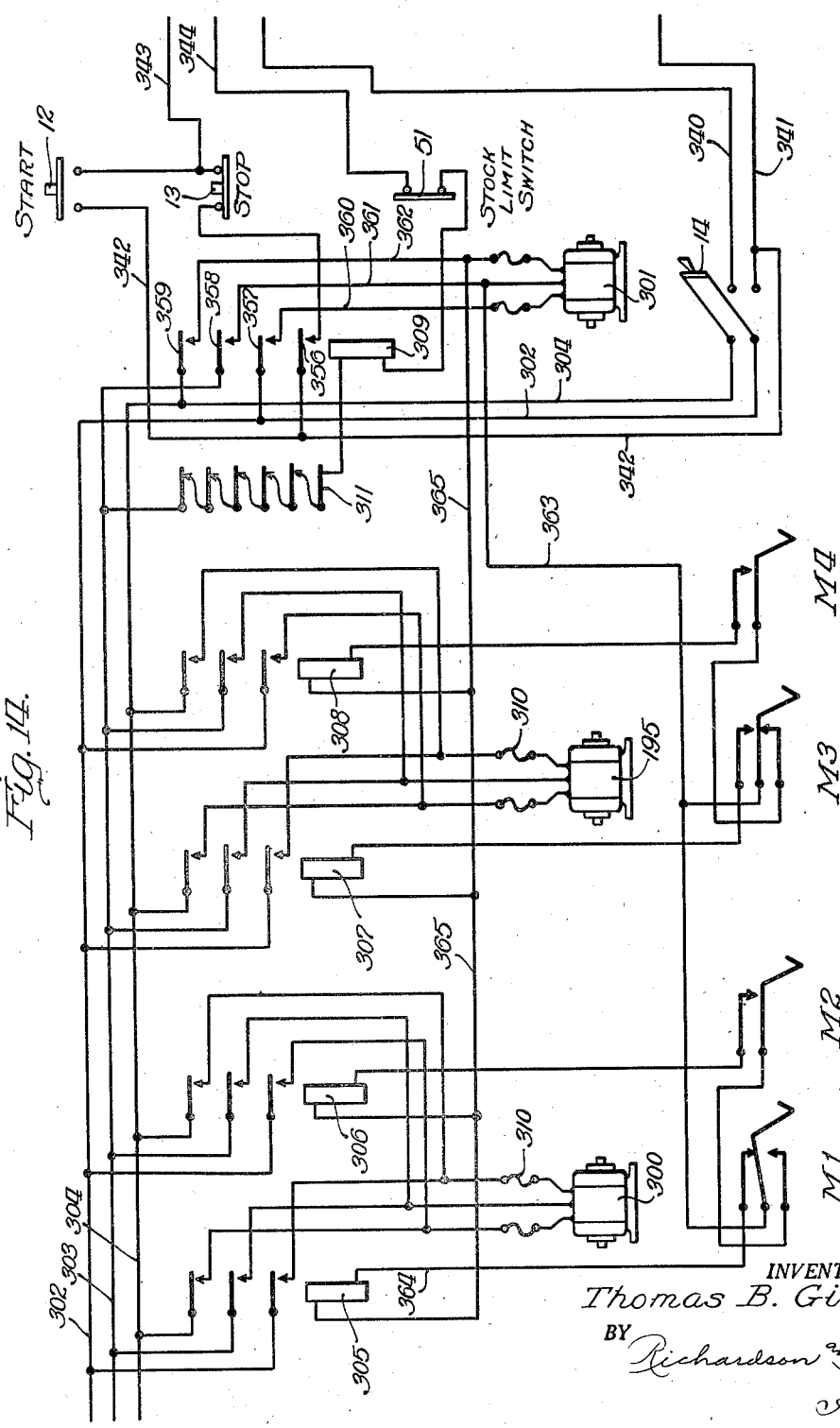

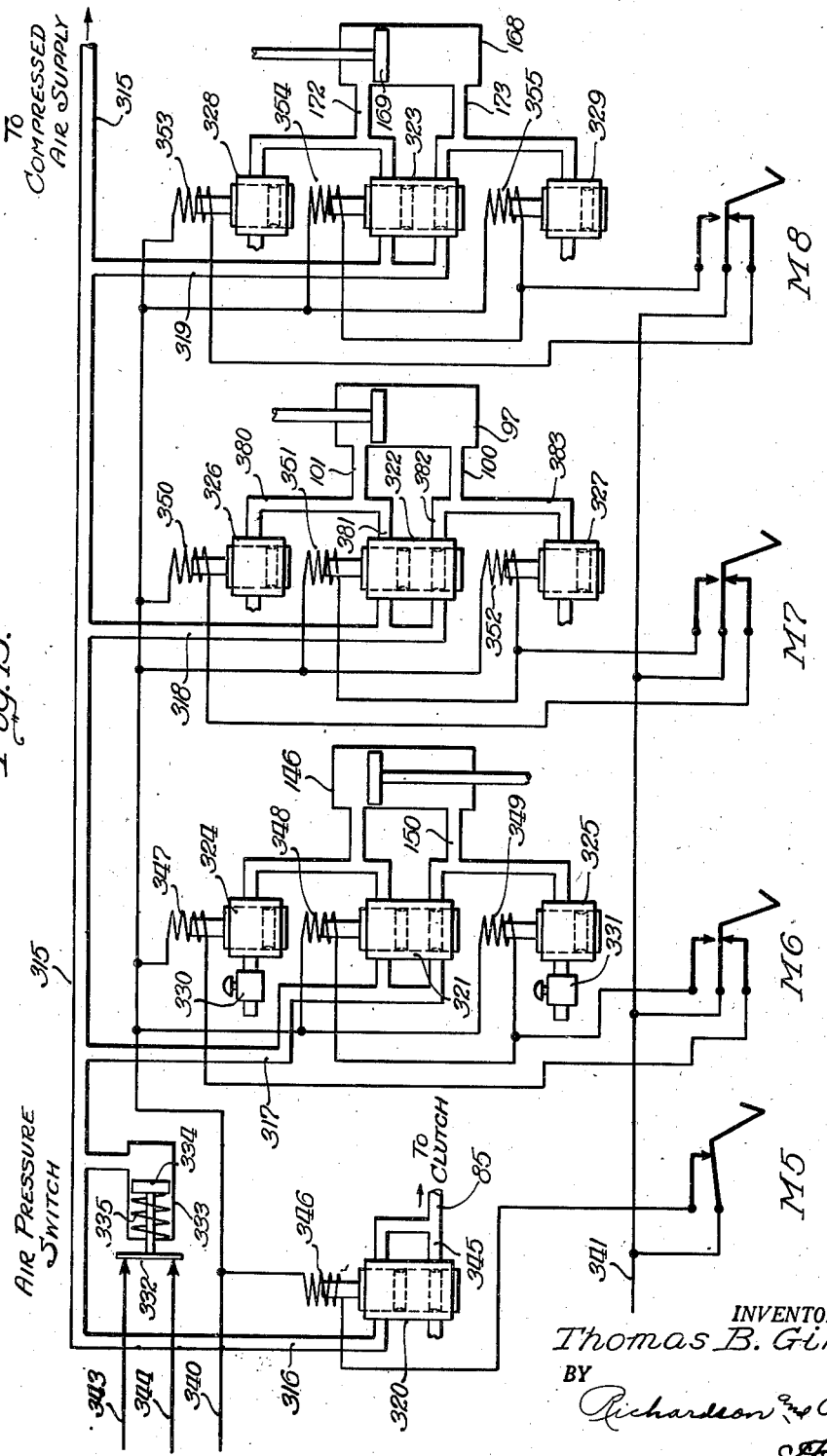

Patented Feb. 4, 1947

2,415,206

UNITED STATES PATENT OFFICE 2,415,206

MACHINE TOOL

Thomas B. Gibbs, Delavan, Wis., assignor to George W. Borg Corporation, Chicago, Ill., a corporation of Delaware Application December 7, 1942, Serial No. 468,060

34 Claims. (Cl. 29—27)

The present invention relates in general to machine tools, but more in particular to machine tools of the automatic type, and the object of the invention is the production of a combined automatic lathe and hobbing machine which is adapted to make small pinions such as are used in clocks or other timepieces.

As referred to above, a pinion includes also a shaft which is formed integrally therewith. It has been the practice heretofore to make these parts from rod stock on an automatic lathe which turns them out complete except for the pinion teeth, which are cut on a separate hobbing machine. The cutting of the pinion teeth, however, is a very difficult operation because the pinions are so small that it is hard to hold them and the shafts are so tiny that they are apt to be bent or broken. A complete pinion including shaft may have an overall length of .246 inch and an overall diameter of .1 inch, with a shaft diameter of .0187 inch. The dimensions given are those of a typical pinion and will give an idea of the extremely small size, and of the difficult problem which is involved in manufacture.

This problem is solved in an efficient manner by the present invention which, as stated before, is a combined automatic lathe and hobbing machine. The machine includes a hollow spindle and collet for holding and rotating the rod stock, a set of radially disposed tools, and a hob which is located just beyond the tools in the direction of head stock motion. In the operation of the machine, the end of the stock is first turned down in the usual manner to form the shaft at one end of the pinion which is being made. When this operation is completed the head stock is moved quickly forward to bring the stock into the vicinity of the hob, and the hobbing operation is performed while the incompleted pinion is still part of the stock. This eliminates the difficulty formerly encountered in holding the pinion while the teeth were being cut by the hob. As soon as the hobbing operation is finished the head stock is returned the proper distance to bring the other end of the pinion in the vicinity of the tools, and the other end of the shaft is turned down. The completed pinion is then cut off from the stock, whereupon the collet is opened and the head stock is moved back to get a fresh grip on the stock preparatory to making another pinion.

The foregoing description of the operation of the machine is extremely brief, but will be sufficient to give an idea of the nature of the invention. More complete information as to the construction and operation of the machine will be found in the detailed specification which follows.

The machine will be described with reference to the accompanying drawings, comprising Figs. 1 to 15, inclusive, which show a preferred embodiment of the invention.

In the drawings:

Fig. 2 is a front view of the same on a larger scale, the base being omitted;

Fig. 3 is a view of the machine as seen from the right in Fig. 2;

Fig. 5 shows the hob, hobbing spindle housing, and associated parts, together with the air cylinder and piston for swinging the hob in and out of operative position;

Fig. 6 is a section through the hobbing spindle housing on the line 6—6, Fig. 5;

Fig. 7 is a section through the stop by means of which the operating position of the hob is adjusted;

Fig. 8 shows a pinion and shaft of the type which is adapted to be made on the machine;

Fig. 9 is a partial section on the line 9—9, Fig. 5;

Fig. 10 is a section through the stock guide bushing bracket on the line 10—10, Fig. 9, and on an enlarged scale;

Fig. 11 is a partial section through the pneumatic clutch which drives the main spindle during the hobbing operation;

Fig. 12 is a section through a part of the clutch housing and other parts showing how air is admitted to the clutch;

Figs. 14 and 15 are diagrammatic circuit drawings showing the electrical and pneumatic control equipment.

The combined automatic lathe and hobbing machine which is the subject-matter of the invention may be considered to be an improvement on or further development of an automatic lathe known as the Tornos high speed automatic lathe. This lathe has been manufactured for some time by Usines Tornos, of Moutier, Switzerland, and many of them are at present in use in the United States. Under these circumstances it will not be necessary to describe in detail those parts of the present machine which correspond to and function the same as similar parts in the Tornos lathe, the construction and operation of which are well known, as indicated above.

Figure 1:
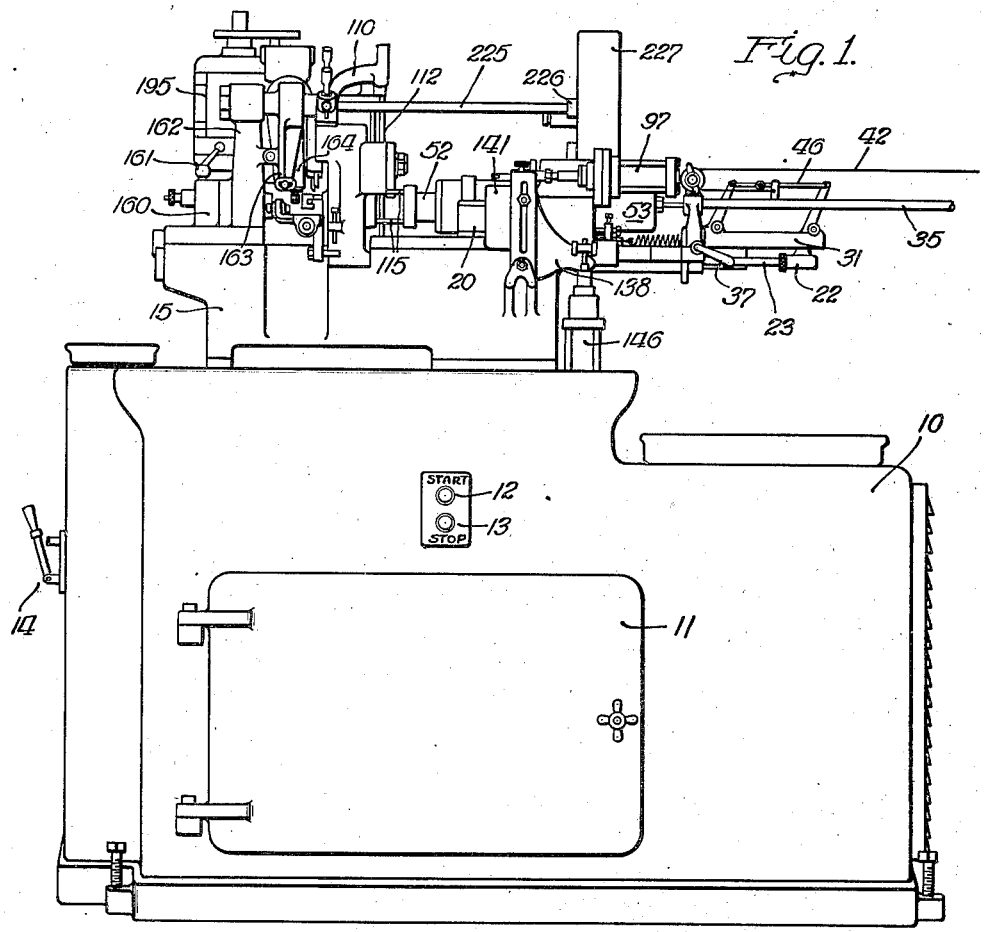
Fig. 1 is a front view of the combined automatic lathe and hobbing machine, including the base.

Referring to Fig. 1, the various parts of the machine are supported on a base 10, which may be of cast iron. The base also forms an enclosure or housing for the cam and spindle motors, parts of the drive mechanism for connecting the motors with the cam shaft and spindle, including speed changing mechanism for the spindle drive, and the magnetic air valves and relays which are shown diagrammatically in Figs. 12 and 13. A door 11 affords access to these parts, and there may be a similar door or suitable opening in the base at the rear.

In the front wall of the base there is mounted a switch assembly comprising the start switch 12 and the stop switch 13. On the left end of the base or at any convenient place a single throw double pole switch 14 is mounted. At the top the base supports the bed 15, which carries the head stock, tool head, hobbing mechanism and various other parts of the machine. These parts will be described in connection with other figures of the drawings in which they are shown in greater detail and on a larger scale.

Referring to Fig. 2, the head stock is indicated at 20 and is supported for sliding movement on the bed 15 in the usual manner. The head stock is urged toward the right by a spring 21 one end of which is attached to the head stock while the other end is attached to the adjustable member 22. The member 22 is slidable on the threaded rod 23 except for the nut 24, by means of which the tension in spring 21 is adjusted. The extreme position of the head stock is determined by the adjustable stop screw 25 which is carried on the post 26 projecting upward from the extension 27 of the bed.

The rod 23 is supported on a casting which is secured to the bed by two cap screws, as shown in Fig. 3, and includes a part 28, a transverse part 29, and an upwardly extending part 30 which supports the integrally formed spring housing 31. The rod 23 is threaded into the transverse part 29 of the casting.

Projecting from the extension 27 of the bed there is a rod 32, which carries two tubular spacers 33 and the adjustable stock tube supporting bracket 34. This bracket extends upward and to the rear, as seen in Fig. 3, and supports one end of the stock tube 35. The bracket 34 is clamped on the rod 32 by means of the bolt 36 having a handle 37. An extension 38 of the bracket 34 supports the pulley 39.

The stock tube 35 may be about ten feet long and suitable means is provided for supporting it at the end opposite the bracket 34. The tube has a slit on top which extends lengthwise of the tube. The follower 40 is slidable in the tube and carries a thin member 41 which projects upward through the slit in the stock tube. A cord 42 is attached to the member 41 and passes around the pulley 39, whence it extends along parallel to the stock tube to a point near the end thereof where suitable means is provided for producing a steady strain on the cord. Any suitable arrangement may be used for this purpose, whereby the cord is kept under tension and the follower 40 is continuously urged to the left. A part of the stock, a round steel rod, is shown at 43, where it leaves the stock tube and enters the spindle. In practice a short guide tube extending to the right from the spindle encloses the stock at this point, but this tube has been omitted from the drawings.

The spring housing 31 supports two pivoted levers 44 and 45, the upper ends of which are connected by a tie rod 46. A short cylindrical member 48 having a cross hole drilled therein is carried on the rod 46 and has a pin 47 projecting forward from one end and a set screw 49 at the rear end by means of which it is clamped to the rod 46. The pin 47 is in the path of the member 41 supported on the follower 40 so that as the stock becomes nearly exhausted the pin 47 is engaged by member 41 and lever 44 is actuated. This lever has a downwardly projecting extension 50, see Fig. 3, for operating the stock limit switch 51 to stop the machine, as will be explained more fully hereinafter.

The hollow spindle is supported on the head stock by means of ball bearings in known manner, and terminates at one end in the collet 52 and at the other end in a pneumatic clutch the housing 53 of which can be seen in Fig. 2. The collet is of known construction and need not be described in detail, although the pneumatic means for operating it will be described. The clutch, however, is of novel construction and will be described in connection with Figs. 11 and 12.

In Fig. 11 the spindle is indicated at 54. It is provided with a pulley 55 and is driven by a belt 56 which passes over the pulley and extends downward through an opening in the head stock to a driving pulley which is part of the speed changing mechanism in the base of the machine. This mechanism does not form part of the invention and is not shown.

One of the several sets of ball bearings which support the spindle is located just to the left of the clutch housing and is shown in Fig. 11. The head stock 20 has a rounded upwardly projecting extension 20' which at its right hand end is a continuation of the boss 57 at the end of the head stock. This boss has a machined circular end surface concentric with which the end of the head stock including extension 20' is bored out to receive the outer ball races 58. The inner ball races 59 are clamped against the shoulder 60 on the spindle 54 by means of the tubular sleeve 61, the clutch member 62 and the nut 63. The clutch member 62 is prevented from turning on the spindle by means of a key 64.

The reference character 65 indicates the clutch bearing member, which is generally of cylindrical shape and has a flange 66 which engages the machined end surface of the boss 57. The clutch bearing member and the clutch housing 53 are secured to the head stock against the boss 57 by means of screws such as 67. The screw 67 passes through the head stock extension 20' and is threaded into the cover member 68. The other screws are threaded into the head stock.

The clutch housing is generally cup-shaped and has an annular interior ridge 69 at the bottom through which the holes are drilled for the screws such as 67. The other end of the clutch housing is closed by the circular plate 70. The bottom of the clutch housing has a semi-circular cutout and the upper wall is also cut away to admit a part of the long pinion 71. This pinion is provided with bearing bushings at the ends, as shown, and is rotatable on the shaft 72 which is supported on the bracket 73 attached to the head stock and an upwardly projecting extension 74 of the clutch housing.

As mentioned hereinbefore, one of the clutch members is indicated at 62 and is rigidly secured to the spindle. The other clutch member is indicated at 75 and is formed integrally with the pinion 76 which is in mesh with the long pinion 71. When the clutch is disengaged, the position in which it is shown in the drawings, the clutch member 75 is rotatable on the clutch bearing member 65.

The clutch member 75 is urged to the right by three coil springs such as 77 which are located in recesses in the clutch member. These springs are compressed between the clutch member and the bronze bearing ring 79, which rotatably engages the air seal ring 78. It will be noted that there is an annular air chamber 80 inside the pinion 76 between the air seal ring 78 and the end of clutch member 75.

The clutch member 75 is urged to the left by air pressure in the annular air chamber 81, which is closed by an air seal ring 82, clamped against the shoulder 83 on the clutch bearing member 65 by means of the nut 84. Compressed air is supplied to the chamber 81 by means of a pipe 85, seen in Fig. 3. This pipe has a coupling which is threaded into an opening 86 at the bottom of the clutch housing. The opening 86 is shown in Fig. 12, which is a section taken on a plane which is angularly displaced from the sectional plane of Fig. 11. From the bottom of opening 86 a hole 87 is drilled through the bottom of the clutch housing and the clutch bearing member 65 to intersect the longitudinal hole 88 drilled in the clutch bearing member. The hole or channel 88 is closed at one end by a plug 89 and at the other end communicates with the air chamber 81 by way of a hole 90 drilled in the clutch bearing member.

The clutch bearing member 65 also has a longitudinal hole or channel 91, Fig. 11, which is similar to the channel 88, Fig. 12. The channel 91 is connected with the air chamber 81 by a hole 92, and is connected with the air chamber 80 by a hole 93.

The valve through which compressed air is supplied to the pipe 85 is so arranged that in its open position the pipe is connected to the compressed air supply source while in its closed position the pipe is opened to the atmosphere. When the air chamber 81 is at atmospheric pressure the springs 77 move the clutch member 75 to the right and hold it in engagement with the clutch member 62. In this condition the clutch is engaged and rotation of the pinion or gear 76 rotates the spindle 54. It should be observed also that the movement of the clutch member 75 to the right closes the air hole 92. When compressed air is supplied to the air chamber 81 the clutch member 75 is moved to the left to disengage the clutch. When the clutch member 75 arrives at about the position in which it is shown in Fig. 11, the hole 92 is partly opened and compressed air leaks out of air chamber 81 into air chamber 80. The movement of the clutch member 75 to the left stops when the air pressure in air chamber 80 becomes high enough to compensate for the difference between the force exerted by the springs 77 and the force exerted by the compressed air in air chamber 81.

The arrangement for opening and closing the collet is the same as on the Tornos lathe except that it is operated by compressed air instead of by a cam on the cam shaft. The mechanism includes a sliding member (not shown) on the spindle, a horizontal lever 94 pivoted on the head stock, and a link 95 by means of which the lever is connected to the piston rod 96 of the air cylinder 97. The air cylinder 97 is secured to a bracket 98 which is attached to the end of the head stock by cap screws, as seen in Fig. 3. Air is supplied to one end of the air cylinder by way of a pipe 100 and to the other end by way of a pipe 101. These pipes, as well as the pipe 85 which supplies compressed air to the clutch, should be flexible to permit movement of the head stock. Rubber hose of the requisite strength may be used.

Figure 4:
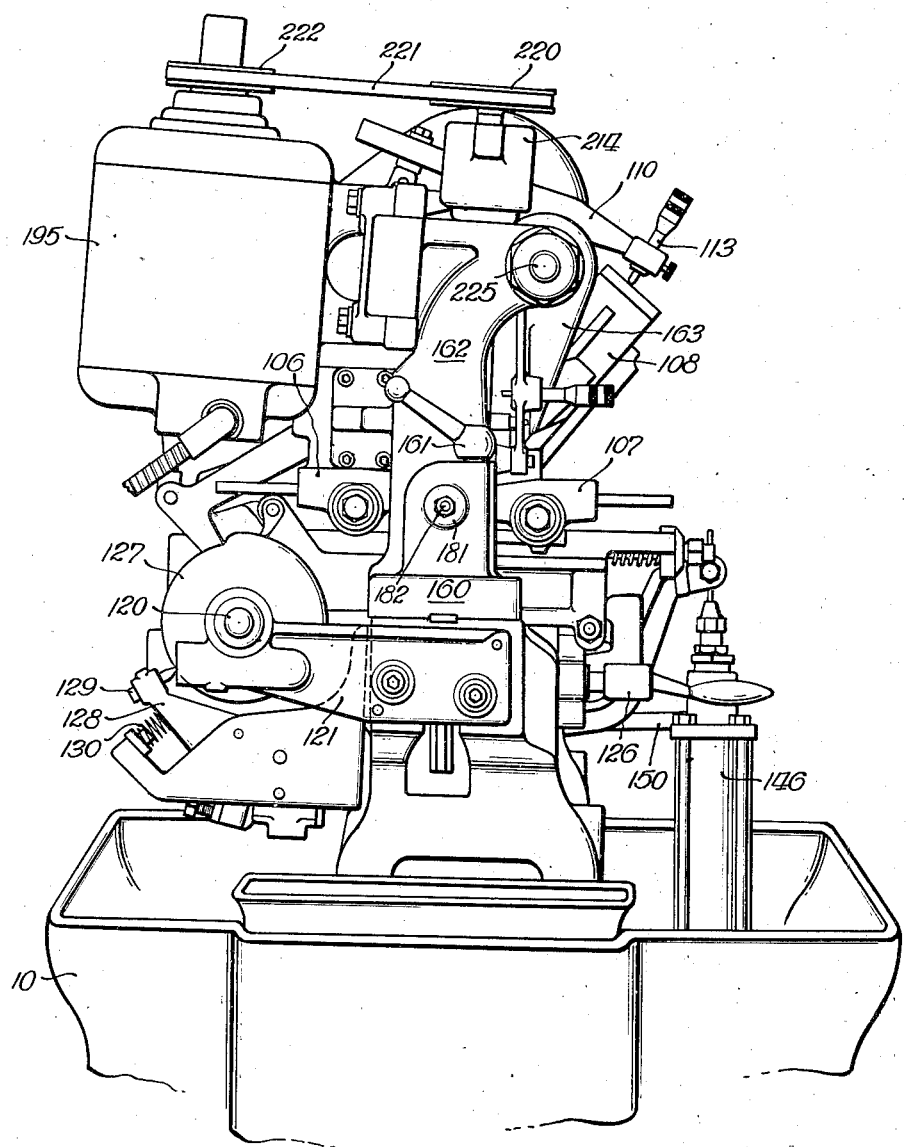
Fig. 4 is a view of the machine as seen from the left in Fig. 2.

The tool head assembly is indicated generally at 105, Fig. 2, and is substantially the same as in the standard Tornos lathe. There are five radially disposed tools mounted in tool holders which are movable toward and away from the stock under the control of cams on the cam shaft. Two of these tool holders are indicated at 106 and 107 in Fig. 4. The mechanism for controlling or operating the tool holders is only partly shown in the drawings, but is well known. The tool holder 108, for instance, seen in Figs. 2 and 4, is slidable radially toward the stock and is retracted by means of springs 109. Movement of the tool holder toward the stock is accomplished by means of a lever 110 which is pivoted at 111 and is cam actuated by means of a push rod 112. The lever 110 operates the tool holder by means of an adjustable pin 113 best seen in Fig. 4. Adjusting devices for the tools are provided but need not be described.

The tool head assembly also includes a guide bushing spindle which is mounted on ball bearings in the main tool head casting and is driven from the main spindle on the head stock by means of two pins 115 which are fixed to the guide bushing spindle and slide in holes drilled in the flange 116 on the end of the collet housing 52. This sliding connection is required because the guide bushing spindle is fixed as regards longitudinal movement, whereas the head stock and collet have such longitudinal movement to feed the stock. The guide bushing spindle carries a guide bushing inside the front cover 117 which is of the proper size to support the stock firmly in the vicinity of the tools while permitting the stock to slide lengthwise under the control of the head stock.

The cam shaft is indicated at 120, Figs. 3 and 4, and is rotatably supported on two brackets 121 and 122 which project to the rear from the bed of the machine. The cam shaft is driven by the cam shaft motor in the base of the machine by means of the belt 123, pulley 124, and suitable gears which are not shown. The pulley 124 may be disconnected by means of the clutch 125 which is operated by the cam release 126, Fig. 2, in known manner. This permits the cam shaft to be rotated slowly by hand during the setting up of the machine.

In addition to the usual cams for controlling the tools the cam shaft carries eight cams for operating the switches which control the electrical circuits of the machine, as will be described presently, and two cams for controlling the head stock movement. The cam 127, Fig. 4, is one of the tool operating cams. The switch operating cams are similar and are located farther along on the cam shaft. Each switch operating cam has a switch operating lever such as 128. These levers are urged toward the cams by springs such as 130 and are provided with cam followers such as 129 which bear on the respective cams. The cams 131 and 132, Fig. 3, are the head stock cams. The cam 132 controls the movement of the head stock during the turning operations while the cam 131 controls the movement of the head stock during the hobbing operation.

The head stock advance mechanism includes the lever 133 which is pivoted on the bed at 135, as shown in Figs. 2 and 3. The lever 133 carries two followers 134 which engage the cams 131 and 132. At the other end of the lever 133 there is a roller 136 which engages a hardened steel block 137 which is pivotally supported at the bifurcated end of the bell crank lever 138. This lever 138 is pivoted on the bed at 139 and carries an adjustable pin or stud 140 which engages the edge of the cam plate 141. The cam plate 141 is secured to the side of the head stock by means of a bolt 142 the head of which is held in the countersunk groove 142¹. The cam plate is adjustable lengthwise of the head stock and the stud 140 is adjustable up and down in the slot 143 in the lever 138.

From the foregoing it will be understood that the advance of the head stock by one of the head stock cams is effected by rotation of the lever 133 on its pivot, the lever 133 in turn rotating lever 138, which moves the head stock to the left by means of the stud 140 and cam plate 141.

The increase in the diameter of cam 131 which occurs at 144 corresponds to the advance of the head stock from turning to hobbing position. The head stock is not advanced in this case, however, by engagement of the follower 134 with the cam surface 144. The slope of surface 144 is too steep and if it were flattened out sufficiently to permit cooperation with the follower valuable time would be lost. A so-called fast advance mechanism is therefore employed to advance the head stock from turning to hobbing position.

The fast advance mechanism includes an extension 145 which is bolted to the lever 133 and an air cylinder 146 which is supported at its lower end on a pivot (not shown) so as to permit a slight oscillating motion in the plane of the extension 145. The piston rod is provided with a cap 147 to which there is attached a small rod 148 which projects upwardly and passes through a cross hole drilled in the short shaft 149. This shaft 149 is rotatably supported at the bifurcated end of the extension 145 and the cross hole in 149 is large enough so that the rod 148 is slidable therein. The function of the rod 148 is to maintain cylinder 146 in upright position, the cylinder being pivoted at the bottom, as previously explained. Air is supplied to the cylinder 146 at the top by means of an air pipe 150 and there is a similar pipe (not shown) for supplying air to the bottom of the cylinder.

The operation of the fast advance mechanism will be readily understood from the foregoing. When compressed air is admitted to the lower end of the cylinder 146, the piston therein is moved upward. The piston rod moves upward also, the rod 148 sliding in the cross hole in shaft 149. Very shortly the cap 147 engages the shaft 149 and the lever 133 is rotated by means of the extension 145 far enough so that the follower 134 can ride up on the cam 131 at about the point 151. The operation of lever 133 advances the head stock to hobbing position. When the hobbing operation is completed compressed air is admitted to the upper end of the cylinder 146 to return the piston so that the head stock may be returned by spring 21.

The reference numeral 160 indicates the tail stock, reference being had particularly to Figs. 2 and 4. The tail stock is rigidly supported on the bed of the machine. A part of the tail stock indicated at 162 projects upward and forward and constitutes a support for the hobbing mechanism.

The reference character 163 indicates the hobbing spindle bracket, which is pivoted on the upper end of the part 162 of the tail stock, as shown clearly in Fig. 9. The hobbing spindle housing 164 is just behind the hobbing spindle bracket to which it is secured by means of four cap screws such as 165 and another similar cap screw 166. The hobbing spindle housing 164 is shown in a substantially vertical position in Fig. 9, but in practice the lower end carrying the hob 167 is moved to the right a certain amount to enable the hob to cut the pinion teeth parallel to the shaft of the pinion. The amount by which the hob housing is inclined to the vertical depends on the pitch of the hob teeth and is adjustable by loosening the cap screws. The holes in the hobbing spindle bracket through which the cap screws 165 pass are large enough to permit the requisite adjustment of the hobbing spindle housing.

The object in pivotally mounting the hobbing spindle bracket 163 is to permit the hob 167 to be moved toward and away from the stock. The means for accomplishing these movements of the hob is shown in Fig. 5 and includes an air cylinder 168 which is suitably mounted on the tail stock 162. Compressed air is supplied to the front and rear ends of the cylinder by air pipes 172 and 173, respectively. Movement of the piston 169 is communicated to the hob by means of the piston rod 170 and the link 171. Fig. 5 shows the hob in partly retracted position, that is, away from the stock. The total travel of the hob may be about ⅜ of an inch. The limit of travel toward the stock is determined by the stop screw 174 which is threaded in the sleeve or bushing 175, the latter being fixed in a hole drilled in the hobbing spindle bracket. The construction is shown in detail in Fig. 7. When the hob is moved toward the stock by the piston 169, the end of the stop screw 174 comes into engagement with the machined surface of a projection 177 which extends to the right from the tail stock 162, as seen in Fig. 9, and the movement of the hob is arrested. This is the working position of the hob. The stop screw is provided with a knurled cap 176 to permit ready manual adjustment thereof.

The tail stock is bored coaxially with the main spindle to receive the tail stock shaft sleeve 180. The shaft sleeve 180 is removable and is locked in position as shown by the locking bolt 161. The tail stock shaft is indicated at 182 and includes a head portion 184 having a sliding fit in the sleeve 180. At the end opposite the head 184 the shaft 182 is slidable in the shaft bushing 181, which has a tight fit inside the sleeve 180. The spring 187 is compressed between the shoulder at 184 and the end of the shaft bushing 181 and urges the shaft 182 to the right, as seen in Fig. 9. The movement in this direction is limited by the adjusting knob 183 which holds the shaft in the position in which it is shown. The shaft is prevented from turning in the sleeve 180 by a key 185 which is slidable in a keyway cut in the enlarged head 184 of the shaft.

The head 184 of shaft 182 is bored out to receive the slightly tapered pivot pin 188, which fits tightly in the head 184. A cross hole 186 drilled through the head 184 and sleeve 180 permits the insertion of a punch to loosen the pivot pin 188 when it is desired to remove the same. It will be understood, of course, that in order to do this the sleeve assembly must first be removed from the tail stock. The pivot pin is slightly reduced in diameter at 189 to receive the stock guide bracket 190, which fits tightly in place on the part 189 of the pivot pin. The end of the pivot pin cannot be seen in Fig. 9, but is shown in Fig. 10, which also shows the stock guide bracket to good advantage. As seen in Fig. 10, the pivot pin and the stock guide bracket are cut away on the side next to the hob to permit the latter to have the necessary access to the stock. At its right hand end the stock guide bracket supports the stock guide bushing 191, which has a longitudinal bore 192 corresponding in diameter to the size of the stock. When the head stock is advanced to hobbing position the stock passes through the bore 192 of the stock guide bushing and the pinion shaft or pivot which has been formed at the end of the stock enters the bearing hole 193 at the end of the pivot pin 188. The stock is thus supported at the stock guide bushing, in which it fits closely, and also at the extreme end where the pinion shaft is inside the bearing hole 193 in the pivot pin. The stock guide bushing has to be changed if a different sized stock is to be used. The pivot pin 188 will also have to be changed if the pinion shaft size is changed.

The hobbing spindle is driven by the motor 195 which is supported on the tail stock as shown in Fig. 4. The hobbing spindle and drive mechanism is best shown in Fig. 6 and will now be described.

The hobbing spindle is of tubular construction and is indicated at 196. At the lower end it has an outwardly tapered head 197 which cooperates with the bushing 198 to form the lower bearing. The reference numeral 199 indicates a washer and 200 is the bearing adjusting nut, which is threaded on the hobbing spindle. This nut is locked by means of a set screw 201 which is accessible through an opening (not shown) in the housing 164. Near its upper end the hobbing spindle has a bearing in the bushing 202 which is held in place by the threaded thimble 203.

The hob 167 is carried on the spindle tip 204, which includes the enlarged tapered part 205 which fits into the reamed out end of the tubular spindle. The spindle tip is held in place by the draw rod 209 which is threaded into the spindle tip 205 at the lower end. This draw rod has an enlarged head 211 at the upper end forming a shoulder which bears against the end of the tubular spindle when the draw rod is screwed into the spindle tip. The head 211 is preferably squared off at 210 so that the draw rod can be tightened up to hold the spindle tip firmly in place. The hob 167 rests against the shoulder 206 on the spindle tip, where it is held by means of washers 207 and a nut 208.

At its upper end the hobbing spindle 196 carries the spur gear 212 which is keyed on the spindle and is held against endwise movement by the set screw 213. The gear 212 is located in a gear housing 214 which forms part of the spindle housing 164. The gear housing has a cover plate 215, as shown, in which there is inserted the bushing 216 which forms one bearing for the shaft 217, the other bearing being at the bushing 218 which is inserted in the lower wall of the gear housing. The shaft 217 carries the gear 219 which is in mesh with gear 212. The shaft is driven from the motor 195 by means of the pulley 222 on the motor shaft, the belt 221, and the pulley 220 on shaft 217.

During the hobbing operation the main spindle and the collet which holds and rotates the stock must be rotated at a predetermined speed, which depends on the speed of the hobbing spindle and the number of teeth to be cut in the pinion being made. To this end the main spindle is preferably driven from the hobbing spindle while hobbing is taking place and the arrangement for effecting this object will now be described.

Referring to Fig. 2, it will be seen that there is a horizontal shaft 225 which extends to the right from the hobbing spindle bracket 163, where it has a bearing as shown in Fig. 9. The shaft 225 is driven by a pair of helical gears comprising gear 230 on the hobbing spindle 196, Fig. 6, and the gear 231 on shaft 225, Fig. 9. These gears become properly meshed when the hobbing spindle housing 164 and the hobbing spindle bracket 163 are assembled together as shown in Fig. 5. From this figure, and Figs. 6 and 9, it will be understood that the gears 230 and 231 are enclosed in a housing which comprises the enlarged portion 232 of the hobbing spindle housing 164 and the hollow semi-circular portion 233 of the hobbing spindle bracket 163.

At its right hand end the shaft 225 has a bearing at the boss 226 which projects from the bottom of the gear housing 227. The gear housing may be a one-piece casting, shaped as shown in Figs. 2 and 3, and supported on the bed of the machine by means of an integrally formed bracket 228. A suitable cover is provided as will be understood, but is not shown in Fig. 3.

The shaft 225 extends through its bearing to the interior of the housing 227, where it is provided with the gear 234. The long boss 235, Fig. 2, affords a bearing for a shaft 236 which extends into the interior of the housing. The shaft 236 carries the gears 237 and 238 which are keyed or otherwise fixed to the shaft so as to rotate together. Between these gears the shaft 236 passes through a bearing in the bracket 239 which is provided for supporting the gear 240. The bracket 239 is adjustable and is held in any adjusted position by a bolt 241 which passes through the slot 242 in bracket 239 and is threaded into the bottom of the housing. The gear 240 may be supported on a bearing sleeve which is clamped to the bracket 239 by a bolt extending through the slot 243 and provided with a nut 244. The gear 240 is properly meshed with gears 234 and 238 by adjustment of the bracket 239 and adjustment of the position of the bearing of gear 240 along the slot 243. The boss 245 supports a short fixed shaft on which the gear 247 is rotatably mounted, being held on the shaft by a nut 246. The gear 247 is driven by the gear 237 and drives the so-called long pinion 71, which was described in connection with the clutch which is shown in Fig. 11.

From the foregoing it will be understood that the hobbing spindle drives the main spindle through the medium of the helical gears 230 and 231, the shaft 225, the gears 234, 240, 238, 237, and 247, the long pinion 71, the gear 76 in the clutch housing, and the clutch members 75 and 62, the latter of which is fixed to the main spindle. The reason for the adjustable mounting of the gear 240 is to enable the speed of the main spindle to be varied in accordance with the number of teeth in the pinions being made. In case a slower speed is required, a larger gear is substituted for the gear 238 and at the same time the bracket 239 and the bearing of gear 240 are adjusted so that the gear 240 will mesh properly with gear 234 and the new gear which replaces gear 238.

Referring now to the circuit drawings, Figs. 14 and 15, the apparatus which is diagrammatically shown therein will be briefly described. For the most part this apparatus is enclosed in the base of the machine and is not shown in the other drawings.

The reference numeral 300 indicates the spindle motor for driving the main spindle, numeral 195 indicates the hobbing motor, previously referred to, while numeral 301 indicates the cam shaft motor. These motors are adapted to operate on three phase alternating current and are controlled by relays 305 to 309, inclusive. The relays also operate on alternating current. The devices such as 310 which are in circuit with the motors may be fuses, but preferably are thermally operated circuit breakers of known type. Each circuit breaker has a normally closed contact such as 311 which it opens in response to an excessively high current flow. The start and stop switches 12 and 13, the stock limit switch 51 and the switch 14, have previously been mentioned and are shown in the proper circuit relation. Three phase power is supplied over the conductors 302, 303 and 304.

In Fig. 15, the reference numeral 315 indicates the main air pipe which extends to a source of compressed air and has branch pipes 316, 317, 318 and 319 leading to the air valves 320, 321, 322 and 323, respectively. These air valves are of a known electro-magnetically operated type, as are the air valves 324 to 329, inclusive. The valves 330 and 331 are adjustable exhaust valves. The valve 320 controls the supply of compressed air to the clutch on the main spindle. The valves 324, 321 and 325 are associated with the head stock fast advance cylinder 146, the valves 326, 322 and 327 are associated with the cylinder 97 which opens and closes the collet, while the valves 328, 323 and 329 are associated with the hob in-and-out cylinder 168. These air cylinders have been described and are shown only in diagrammatic form in Fig. 15.

The reference numeral 332 indicates an air pressure switch which as shown in the drawings comprises an air cylinder 333 connected to the main air supply pipe 315 and a piston 334 which is urged to the left by the air pressure to hold the switch member 332 in closed position. In case of failure of air pressure the piston is moved to the right by the spring 335 and the switch is opened.

The reference numerals M1 to M8, inclusive, indicate the eight switches which are operated by the eight switch cams hereinbefore mentioned. Any suitable type of switch may be used, but I prefer to use a well known type of quick acting switch which is generally referred to as a microswitch. The cams which operate these eight switches are not shown in Figs. 14 and 15 but are shown in conventional manner in Fig. 13. This figure shows the cam contours in parallel relation which facilitates an understanding of the timing.

The operation of the machine will now be described, it being assumed for this purpose that the machine is being used to make small pinions such as the pinion shown in Fig. 8. This pinion is made from rod stock of the same size as the largest diameter of the pinion and comprises a shaft section 275, a shoulder section 276, the pinion proper 277, a tapered shoulder section 278, a shoulder section 279, and a shaft section 280. The pinion teeth are not actually shown, but their depth is indicated by the dotted lines. The tapered shoulder 278 provides for mounting a gear wheel, which is pressed on and secured by staking. The shaft sections 275 and 280 run in suitable bearings when the pinion and gear are assembled with the other parts of the device in which they are used, such as a clock, for example.

As previously mentioned, the conductors 302, 303 and 304 are connected to a commercial three phase power source, and it may be assumed that the power is on. It will also be assumed that compressed air is being supplied to the main air pipe 315 at the proper pressure. The operator first closes the switch 14, which connects the power supply conductors 304 and 302 to conductors 340 and 341, respectively, over which current is supplied to the magnetic air valves in Fig. 15. The power supply conductor 302 is also connected to conductor 342 which extends to the start switch 12.

Figure 13:
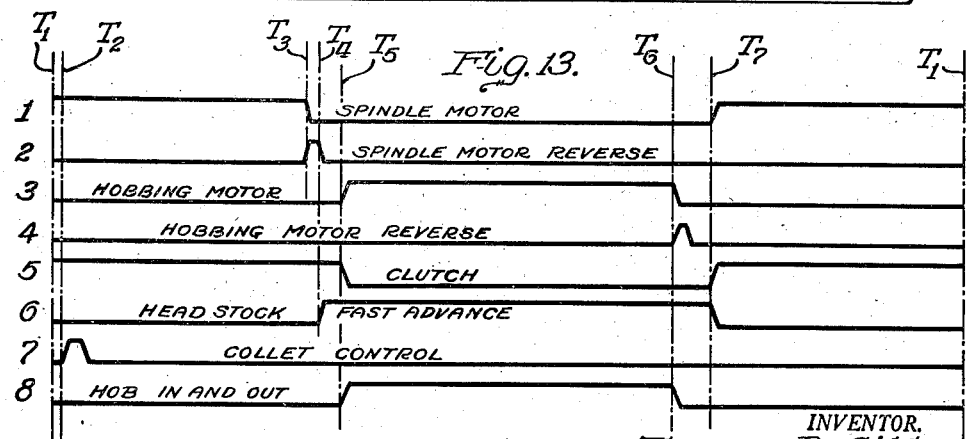
Fig. 13 shows graphically the timing of the cams which control certain operations of the machine.

It will be assumed that switch 14 is closed at time T1, Fig. 13. At this time the parts are in the position which they assume just as a pinion is completed and is cut off from the stock. By reference to Fig. 13 it will be seen that at time T1 the spindle motor cam 1 and the clutch cam 5 are in position to operate their associated switches M1 and M5, which are shown in operated position in Figs. 14 and 15. All the other cams are in inoperative position and the corresponding switches are shown in normal or unoperated position.

The fact that switch M1 is in operated position is of no consequence at the moment, since relay 309 is deenergized. The operated switch M5, however, closes an obvious circuit for the solenoid 346 of the magnetic air valve 320, thus operating this valve to close the exhaust pipe 345 and to extend the branch air supply pipe 316 to pipe 85 which extends to the clutch. The supply of compressed air to the clutch causes it to become disengaged in the manner previously explained.

The switches M6, M7 and M8 being in unoperated position, the normally closed contacts of these switches complete circuits for the solenoids 347, 350 and 353 of the air valves 324, 326 and 328, respectively. These solenoids are accordingly energized and the corresponding air valves are opened.

The operator may now close the start switch momentarily, thereby completing a circuit for relay 309 which extends from conductor 302 by way of switch 14, conductor 342, start switch 12, conductor 343, air pressure switch 332, conductor 344, stock limit switch 51, winding of relay 309, and thermal breaker contacts such as 311 to conductor 303. Upon energizing over the above circuit relay 309 closes a locking circuit for itself which is the same as the original energizing circuit except that it includes contact 356 of relay 309 and the stop switch 13 instead of the start switch 12. Relay 309 is thus held up independent of the start switch 12, which may be restored.

It will be noted that the energization of relay 309 responsive to operation of the start switch is contingent upon switch 14 having previously been closed, and is also dependent upon switches 332 and 51 being closed. It will be clear also that the opening of any one of these switches will cause the deenergization of relay 309. In case the air pressure should fail, for example, switch 332 is opened and the locking circuit of relay 309 is broken, causing the relay to deenergize.

In energized position, relay 309 extends the power supply conductors 302, 303 and 304 by way of contacts 357, 358 and 359 to conductors 360, 361 and 362, which extend to the cam shaft motor 301. This motor accordingly starts to run. At the same time a circuit is completed for relay 305, extending from conductor 361 by way of conductor 363, operated switch M1, conductor 364, winding of relay 305, and conductor 365 to conductor 362. Upon energizing over the above circuit, relay 305 extends the power supply conductors 302, 303 and 304 to the spindle motor 300 in an obvious manner, and this motor starts to run.

At time T2, Fig. 13, the collet control cam 7 operates its associated switch M7, thereby breaking the circuit of solenoid 350 of air valve 326 and closing circuits for solenoids 351 and 352 of air valves 322 and 327. The deenergization of solenoid 350 closes the air valve 326. The energization of solenoid 352 opens air valve 327. The energization of solenoid 351 operates valve 322, which connects the branch air supply pipe 318 to pipe 381 and disconnects it from pipe 382. Compressed air is now supplied to the cylinder 97 by way of pipes 381 and 101 and the piston is moved downward (to the right as seen in Fig. 2), expelling the air from the lower end of the cylinder by way of pipes 100 and 383 and the now open valve 327.

The operation of the piston in cylinder 97 as described in the foregoing opens the collet 52; that is, the collet is caused to release its grip on the stock. At this time the tool last used, the one which cut off the finished pinion, is in forward position and the end of the stock is held against this tool by the stock feed mechanism which includes the follower 40.

As soon as the collet has opened the head stock cam allows the head stock to move to the right as seen in Fig. 2 to enable the collet to get a fresh grip on the stock. During this movement of the head stock the collet slides along the stock, the distance moved being equal to the length of stock required for one pinion.

The switch M7 remains operated for only a very brief interval, just sufficient to permit the requisite head stock movement. When the switch M7 restores solenoid 350 is again energized and solenoids 351 and 352 are deenergized. Valve 326 accordingly opens pipe 380, valve 327 closes pipe 383, and valve 322 changes position so as to disconnect supply pipe 318 from pipe 381 and connect it to pipe 382. Compressed air is thus supplied to the lower end of the cylinder by way of pipes 382 and 100, which restores the piston and permits the collet to close. During the return movement of the piston air is expelled from the cylinder by way of the pipes 101, 380 and the open valve 326.

From time T2 to time T3, Fig. 13, the turning operations which are required to form the shaft 275 and the shoulder 276 of the pinion shown in Fig. 8 take place. These operations are performed in known manner and need not be described in detail.

At time T3, the turning operations being completed, the spindle motor cam 1 restores switch M1 and the spindle motor reverse cam operates switch M2. Switch M1, upon restoring, breaks the circuit of relay 305, which deenergizes and cuts off the supply of power to the spindle motor 300. The switch M2 closes a circuit for relay 306, it being noted, however, that this circuit is not closed until the switch M1 has restored. Upon energizing, relay 306 extends the power supply conductors 302, 303 and 304 to the spindle motor 300 again, but in this case two of the phases are reversed, which quickly stops the motor. The switch M2 remains operated only for a brief interval, long enough to stop the motor but not long enough to accelerate it in the opposite direction. When switch M2 restores, relay 306 deenergizes and the spindle motor remains disconnected from the power supply conductors for the time being.

At time T4 the head stock fast advance cam 6 operates switch M6, thereby breaking the circuit of solenoid 347 and closing circuits for solenoids 348 and 349. On deenergizing, solenoid 347 closes air valve 324, while the energization of solenoid 349 opens the air valve 325. The energization of solenoid 348 causes the valve 321 to change position, whereby compressed air is shut off from the lower end of the cylinder 146 and is admitted to the upper end. It will be noted that the position of cylinder 146 is reversed from the position in which it is shown in Fig. 3, which has been done to avoid crossing of air pipes. In response to the admission of air to the cylinder the piston is forced downward (upward in Fig. 3) and the head stock is advanced to hobbing position. The operation of the head stock fast advance mechanism has already been explained. It should be stated, however, that during the movement of the piston air is expelled from the cylinder 146 by way of an air pipe 150 and open valve 325 at a moderate rate due to the manually adjustable valve 331 which is partly closed. The valve 331 is adjusted properly so as to obtain a desirable cushioning effect from the air being expelled from the cylinder and thus prevent overthrow of the head stock and possible damage to the parts. Valve 330 is similarly adjusted to eliminate shock upon the return of the head stock.

When the head stock is advanced as described in the foregoing, it moves to the left as seen in Fig. 2, and the end of the stock passes through the opening 192 in the stock guide bushing 191, Fig. 10. The movement of the head stock and stock is sufficient to cause the shaft 275 of the partly formed pinion, see Fig. 8, to enter the bearing hole 193 at the end of the pivot pin 188. The shoulder 276 engages the end of the pivot pin and forces the pivot pin and shaft 182 very slightly to the left as seen in Fig. 9 against the tension of spring 187.

At time T5 the hobbing motor cam 3 and the hob in-and-out cam 8 operate their respective switches M3 and M8, and the clutch cam 5 restores the switch M5.

The switch M3, upon operating, closes a circuit for relay 307, which energizes and connects the power supply leads 302, 303 and 304 to the hobbing motor 195. The motor accordingly starts to run.

The restoration of the switch M5 breaks the circuit of the solenoid 346, which deenergizes and restores the valve 320. By this operation of the valve the supply of compressed air to pipe 85 is cut off and the said pipe is vented to the atmosphere. The clutch accordingly becomes engaged as previously explained and the main spindle is coupled to the hobbing spindle. The hobbing motor now drives the hobbing spindle and also drives the main spindle at the proper speed. It will be noted that the main spindle is still connected to its own motor but the power has been disconnected from the spindle motor and it is free to rotate in response to rotation of the main spindle.

The operation of the switch M8 breaks the circuit of solenoid 353 and closes circuits for solenoids 354 and 355. The deenergization of solenoid 353 permits valve 328 to close, while the energization of solenoid 355 opens valve 329. The energization of solenoid 354 changes the position of valve 323 so that compressed air is shut off from pipe 173 and is admitted to pipe 172, leading to cylinder 168. The piston 169 is accordingly moved downward (to the right as seen in Fig. 5) and the hob 167 is moved in toward the stock. The movement of the hob is stopped by the limit pin 174, when the hob has moved in far enough to cut teeth of the required depth as indicated by the dotted lines in Fig. 8.

The hobbing operation now proceeds, the hob being rotated by the hobbing motor and the stock being rotated by the collet and main spindle which is now being driven from the hobbing spindle. At the same time the stock is gradually fed to the left by the cam 131, Fig. 3, which now controls the head stock position. The movement of the stock to the left is permitted by the slidable mounting of the tail stock shaft 182, which moves to the left also against the tension of spring 187. While the hobbing operation is taking place the stock is firmly supported by the stock guide bushing 191 and by the pivot pin 188 on the tail stock shaft 182.

The hobbing operation is completed at time T6, whereupon the hobbing motor cam 3 restores switch M3, the hob in-and-out cam 8 restores switch M8, and the hobbing motor reverse cam 4 operates switch M3.

The restoration of switch M3 causes the deenergization of relay 307, which disconnects the power supply conductors from the hobbing motor 195.

The operation of switch M4 brings about the energization of relay 308 which connects the power supply conductors to the hobbing motor 195 with two phases reversed, which quickly stops the motor. Switch M4 is operated only for a brief interval after which the switch is restored and relay 308 is deenergized.

The restoration of switch M8 deenergizes solenoids 354 and 355 and energizes solenoid 353. Valve 329 is accordingly closed, valve 328 is opened, and the position of valve 323 is altered so that compressed air is admitted to pipe 173 and is shut off from pipe 172. Thus the piston 169 is operated to move the hob out to its normal position. This return movement of the hob occurs while the headstock is still in its most advanced position.

At time T7 the clutch cam 5 reoperates switch M5, the head stock fast advance cam 6 restores switch M6, and the spindle motor cam 1 reoperates switch M1. The operation of the spindle motor switch M1 should in fact occur about 2 degrees later than the operation of the switch M5.

When the switch M5 is operated the solenoid 346 becomes energized and compressed air is admitted to the pipe 85 to disengage the clutch. This uncouples the main spindle from the hobbing spindle.

The restoration of switch M6 energizes solenoid 347 to open valve 324, deenergizes solenoid 349 to close valve 325, and deenergizes solenoid 348, whereupon valve 321 changes position to admit air to pipe 150 and shut off the air from the pipe leading to the other end of the cylinder 146. These operations cause the return of the piston to the position shown and permit the return of the head stock by spring 21, the cam 31 having rotated far enough by this time to clear its follower. The return of the head stock is arrested by the cam 132 at the proper point for the start of the subsequent turning operations which are required to complete the pinion. The return movement is arrested without shock, due to the air valve 330, which as previously mentioned is adjusted to allow only a somewhat gradual exhaustion of the air through valve 324.

The operation of switch M1 causes the energization of relay 305, which again connects the power supply conductors to the spindle motor 300, and the motor starts to run. The main spindle is now again driven by its own motor.

Further turning operations now take place, whereby the shoulders 278 and 279 and the shaft section 280 are formed. The last operation is a cutting off operation which severs the completed pinion from the stock. This occurs just prior to time T1 and is followed by a repetition of the various operations which result in the production of another pinion, etc. The machine will produce completed pinions of the general type shown in Fig. 8 at the rate of two per minute, or thirty seconds for each pinion.

It will be understood that the cam timing shown in Fig. 13 is more or less approximate and is intended only to show the relative order in which the various operations take place. In practice the cam timing is stated in degrees of rotation of the cam shaft and is calculated accurately in accordance with the requirements of the particular part to be made.

When the stock is nearly used up the stock limit switch 51 is opened in the manner previously explained, thereby opening the locking circuit of relay 309 and stopping the machine. The operator then loosens the stock tube bracket 34 by means of handle 37 and pulls the stock tube 35 forward far enough so that a fresh length of rod stock can be inserted in the tube from the machine end, the follower 40 being forced back along the stock tube as the new length of stock is inserted therein. The stock tube is then returned to its normal position and the stock tube bracket is locked in position.

The operator can stop the machine temporarily at any time by operating the stop switch 13, which opens the locking circuit of relay 309. This stops the motors but does not cut off the supply of current to the magnetic air valves. In case of a longer shutdown the switch 14 is opened.

The invention having been described, that which is believed to be new and for which the protection of Letters Patent is desired will be pointed out in the appended claims.

I claim:

1. A combined automatic lathe and hobbing machine for making pinions from rod stock, comprising means for gripping and rotating the stock and for axially advancing and returning it, means for forming a shaft section at the end of the stock, means for cutting pinion teeth in the adjacent section of stock, means for forming another shaft section beyond the pinion section, and means for cutting the completed pinion and shaft from the stock.

2. A combined automatic lathe and hobbing machine for making pinions from rod stock, comprising means for gripping and rotating the stock and for axially advancing and returning it, means for turning down the end section of the stock to form a shaft section, means including a hob for cutting pinion teeth in the next adjacent stock section, means for turning down a third stock section to form another shaft section, and means for cutting off the finished pinion and shaft from the stock.

3. A combined automatic lathe and hobbing machine for making pinions from rod stock, comprising means for gripping and rotating the stock and for axially advancing and returning it, means for performing two turning operations at spaced sections of the stock to form a pinion shaft, means for cutting the pinion teeth at an intermediate stock section after the first turning operation is completed and before the second is started, and means for cutting the finished pinion and shaft from the stock.

4. A combined automatic lathe and hobbing machine for making pinions from rod stock, comprising means including a hob for cutting teeth in a section of said stock, means including a cutting tool for severing said section from the stock in timed relation to the completion of the hobbing operation, means for gripping said stock and for rotating the same at different speeds during the hobbing and severing operations, and means for axially moving the stock after the hobbing operation is completed to bring the point where the stock is to be severed adjacent said cutting tool.

5. In a combined automatic lathe and hobbing machine, means including a head stock for holding and manipulating the stock, a turning tool and a hob in different positions axially of the stock, means for moving the head stock to bring the stock alternately to turning and hobbing positions, means for moving the hob toward and away from the stock when the same is in hobbing position, and cam operated means for controlling the movements of the head stock and hob in timed relation to each other.

6. In a combined automatic lathe and hobbing machine, a spindle, a hob, a motor for driving said spindle during turning operations, a motor for driving said hob during a hobbing operation, means including gears for causing the hob motor to drive said spindle during said hobbing operation, and means for changing the gear ratio to change the number of teeth cut by said hob.

7. In a combined automatic lathe and hobbing machine, a spindle, a motor for driving said spindle during turning operations, a hob, a motor for driving said hob during a hobbing operation, means for cutting off the power to the spindle motor during the hobbing operation to allow said motor to run free, and means for coupling said spindle to the hob motor during said hobbing operation, whereby the spindle and spindle motor are driven from the hob motor.

8. In a combined automatic lathe and hobbing machine, a spindle, a spindle motor for driving said spindle during turning operations, a hob, a hob motor, a cam shaft and means for rotating it, a clutch for coupling said spindle to said hob motor, a cam on said shaft for axially advancing said spindle while the same is coupled to said hob motor, switches for controlling said motors and said clutch, and other cams on said shaft for operating said switches in timed relation to each other.

9. In a combined automatic lathe and hobbing machine, a spindle, a motor for driving said spindle during turning operations, a hob, a motor for driving said hob, a cam shaft, a motor for driving said cam shaft, means for manually starting the cam shaft motor, and switches controlled by cams on said shaft for starting and stopping the spindle and hob motors.

10. In a combined automatic lathe and hobbing machine, two motors for driving the spindle and hob, respectively, a cam shaft and motor for driving it, means for manually starting the cam shaft motor, three phase circuits for independently operating the spindle and hob motors, reversed phase circuits for stopping the spindle and hob motors, and switches controlled by cams on said cam shaft for controlling said circuits.

11. A combined automatic lathe and hobbing machine for making pinions from rod stock, comprising means including a hob for cutting the pinion teeth in a section of the stock spaced from the end thereof, means for turning down the stock on both sides of said section to form the pinion shaft, means for cutting off the finished pinion, means for rotating the stock at high speed during the turning and cutting off operations, and means for rotating the stock at a slow speed bearing a predetermined relation to the speed of the hob during the hobbing operation.

12. A combined automatic lathe and hobbing machine for making pinions from rod stock, comprising means for performing turning and hobbing operations on a part of the stock, said operations being performed with the stock in different positions, means including a head stock for manipulating the stock, cam operated means for controlling said head stock during said turning and hobbing operations, and independent fast advance mechanism for quickly shifting said head stock from turning position to hobbing position.

13. A combined automatic lathe and hobbing machine for making pinions from rod stock, comprising means including a head stock for holding and manipulating the stock, a tool for turning down the end section of the stock to form a shaft section, a hob forward of said tool, means for advancing said head stock to associate the stock with said hob, and a tail stock including a bearing member for receiving said shaft section to aid in supporting the stock during the hobbing operation.

14. A combined automatic lathe and hobbing machine for making pinions from rod stock, comprising means for turning down the end section of the stock to form a shaft section of a pinion, a hob, means for advancing the stock axially to a position where a section thereof adjacent said end section can be operated on by said hob, a tail stock, a bearing member on said tail stock for receiving said shaft section to support the stock, means for gradually axially feeding said stock during the hobbing operation, and means including a resilient element permitting said bearing member to move responsive to the feed motion of the stock.

15. In a combined automatic lathe and hobbing machine for making pinions from rod stock, turning tools, a hob, means including a head stock for supporting and manipulating said rod stock, means for moving said head stock to position a section of said stock adjacent said tools and adjacent said hob alternately, means for moving the said tools and said hob to bring them successively into operative relation to the said section of stock, and cam controlled means for effecting the head stock, tool and hob movements in timed relation to each other.

16. In a combined automatic lathe and hobbing machine for making pinions from rod stock, a hollow spindle for receiving the stock, a collet mounted on said spindle for holding the stock, a head stock supporting said spindle, means for rotating said spindle to perform a turning operation on a section of said stock, a hob and means for driving it, means for advancing said head stock to bring an adjacent section of the stock to the vicinity of said hob, means for moving said hob toward the stock, means for further advancing said head stock to enable the hob to cut the pinion teeth, means for returning the hob after the teeth are cut, means for coupling said spindle to the hob during the hobbing operation, a cam shaft and means for rotating it, and means including cams on said shaft for controlling the movements of said head stock and hob in timed relation to each other.

17. In a machine tool for making pinions from rod stock, means including a head stock for manipulating the stock, means for performing a turning operation on the stock in one position thereof, means for advancing the head stock to move the stock longitudinally to a second position, a supporting bearing through which a part of the stock passes in its movement to said second position, and a hob adapted to operate on a part of the stock which has passed through said bearing.

18. In a machine tool for making pinions from rod stock, means for forming a shaft on the end of the stock, supporting means for the stock forming two spaced bearings, one bearing being of the proper size to receive the stock and the other being of the proper size to receive said shaft, means for advancing the stock longitudinally to cause the stock and shaft to enter said bearings, respectively, and a hob adapted to operate on the stock at a point between said bearings.

19. In a combined hobbing machine and lathe for making pinions from rod stock, a main spindle, a hobbing spindle, separate means for driving said spindles, respectively, means including a train of gears and a clutch for driving said main spindle from said hobbing spindle, one of said gears being changeable to change the ratio of main spindle speed to hobbing spindle speed, and means for adjusting the adjacent gear to cause the same to mesh properly with the changed gear and another gear of said train.

20. In an automatic hobbing machine and lathe for making pinions from rod stock, means for partly forming a pinion by turning operations on the stock, a hobbing spindle and hob supported thereon, a hobbing spindle bracket supporting said hobbing spindle, means for advancing the stock and partly formed pinion to a point opposite said hob, means pivotally supporting said bracket, means for rotating said bracket on its pivot to move the hob toward said partly formed pinion, and an adjustable stop to limit the extent of said movement.

21. In a combined hobbing machine and lathe for making pinions from rod stock, means for manipulating the stock including means for advancing it from turning position to hobbing position, a hobbing spindle and hob supported thereon, a pivoted bracket for supporting said hobbing spindle, an air cylinder having a piston connected to said bracket, and means for admitting compressed air to opposite ends of said cylinder alternately to swing said bracket on its pivot and move said hob toward and away from said stock while the same is in hobbing position.

22. In an automatic hobbing machine and lathe for making pinions from rod stock, a spindle and collet for holding and rotating the stock, a sliding head stock supporting said spindle and adapted to impart longitudinal movement to the stock, mechanical means including a cam for slowly advancing said head stock, means including an air cylinder and piston for rapidly advancing said head stock following the slow advance thereof for a predetermined distance, said last means including also a cam controlled air valve for admitting air to said cylinder, and a spring for returning said head stock.

23. In a combined automatic lathe and hobbing machine, a spindle and collet for holding and rotating rod stock, a head stock having two positions in which turning and hobbing operations, respectively, are performed, an air cylinder, means including a piston responsive to the admission of compressed air to one end of said cylinder for advancing said head stock from turning to hobbing position, a valve operated in timed relation to the completion of said turning operation to control said admission of air to said cylinder, and means for limiting the rate at which air is expelled from the other end of said cylinder to prevent an excessively rapid movement of said head stock.

24. In a combined automatic lathe and hobbing machine for making pinions from rod stock, means including a spindle for rotating said stock, a headstock supporting said spindle, means for operating said headstock to axially move a section of said stock to different positions, means including a cutting tool for performing turning operations on a part of said stock section in one headstock position, and means including a hob for cutting pinion teeth in another part of said stock section in another headstock position.

25. In a combined automatic lathe and hobbing machine for making pinions from rod stock, means for gripping and rotating said stock, a plurality of radially movable tools, means for operating one or more of said tools to form a shaft section at the end of said stock, a hob, means for axially advancing said stock to associate an adjacent section of the stock with said hob, means for operating said hob to cut pinion teeth in said adjacent section, means for returning the stock to associate a third section thereof with said tools, and means for operating one or more of said tools to form a second shaft section opposite said first shaft section and to cut off the pinion from the stock.

26. In a combined automatic lathe and hobbing machine, means including a main spindle for manipulating the stock during turning and hobbing operations, a shaft extending parallel to said spindle, means for coupling one end of said shaft to said spindle, a hob shaft bracket rotatable on said shaft at the other end thereof, a hob shaft supported on said bracket, means for driving said hob shaft, and gears for causing said hob shaft to drive said first shaft.

27. In a machine tool, a bed, a headstock slidable on said bed, a spindle rotatably supported on said headstock, and means for rotating said spindle including a gear supported on said bed, a pinion supported on said headstock and arranged to continuously mesh with said gear notwithstanding motion of said headstock relative to said bed, a second pinion supported coaxially with said spindle and in mesh with said first pinion, and a clutch for coupling said second pinion to said spindle.

28. In a machine tool for making parts from rod stock, means including a spindle for holding and rotating the stock, a headstock supporting said spindle, means for moving said headstock to axially advance the spindle and stock, a gear supported independent of said headstock, a pinion supported on said headstock and maintained in mesh with said gear during motion of the headstock, and means including a clutch for coupling said pinion to said spindle, whereby rotation of said gear produces rotation of said spindle.

29. In a machine tool for making parts from rod stock, means including a headstock and spindle carried thereon for rotating said stock and for axially advancing it, tools for operating on said stock in two different positions thereof, a cam shaft, means including two cam surfaces rotated by said shaft for slowly advancing said headstock through said two positions, respectively, at speeds depending on the cam shaft speed, fast advance mechanism for advancing said headstock from the first position to the second position at a speed which is independent of cam shaft speed, and cam controlled means for initiating the operation of said fast advance mechanism.

30. In a machine tool for making parts from rod stock, means including a headstock and spindle carried thereon for rotating said stock and for axially advancing the same, two tools spaced apart in the direction of headstock motion, means including a cam surface for controlling the headstock while the stock is being operated on by the first tool and a second cam surface for controlling the headstock while the stock is being operated on by the second tool, the radius of said second cam surface being longer than the radius of the first cam surface by an amount which corresponds to the spacing of said tools, and independent means adapted to interrupt the control of headstock motion by said first cam surface and advance said headstock a distance equal to said spacing to enable said second cam surface to assume control of headstock motion.

31. In a machine tool for making parts from rod stock, means including a headstock and spindle carried thereon for rotating the stock and for axially advancing the same, two tools spaced apart along the line of travel of the stock, means including a cam and follower for controlling the headstock movement to advance the stock, said cam having a section for controlling the headstock motion while the stock is being operated on by the first tool and a section of larger radius for controlling the headstock motion while the stock is being operated on by the second tool, and independent means for advancing said headstock to move said stock from the first tool to the second and to adjust said follower to a position where it can cooperate with said last mentioned cam section.

32. In a combined automatic lathe and hobbing machine, a spindle, a spindle motor for driving said spindle during turning operations, a hob, a hob motor, means including a pneumatic clutch for connecting said hob motor with said spindle during hobbing operations, a magnetic valve for supplying compressed air to disengage said clutch, means including a switch for supplying current to open said valve, a start switch for starting said spindle motor, and circuit arrangements whereby said start switch is ineffective to start said motor unless said first mentioned switch is closed.

33. In a combined automatic lathe and hobbing machine, said machine having a spindle and a hob, an electric motor for driving said hob, a fluid operated clutch for connecting said spindle to the hob motor during hobbing operations and for disconnecting the spindle from said hob motor during turning operations, an electric motor for driving said spindle during turning operations, and means responsive to a failure in the supply of fluid to said clutch for stopping said last mentioned motor.

34. In an automatic machine tool, a spindle for holding a work piece, two independent drives for rotating said spindle, the second of said drives including an irreversible power transmitting device, a fluid operated clutch also included in said second drive and effective to disconnect the second drive from the spindle when the same is being rotated by the first drive, and means responsive to a failure in the supply of fluid to said clutch to render said first drive inoperative to rotate said spindle.

THOMAS B. GIBBS.

REFERENCES CITED

The following references are of record in the file of this patent:

UNITED STATES PATENTS

| Number | Name | Date |
| --- | --- | --- |
| 1,537,801 | Cookburn | May 12, 1925 |
| 2,019,155 | Ruppel | Oct. 29, 1935 |
| 2,219,694 | Miller | Oct. 29, 1940 |
| 2,029,335 | Oberhoffken et al. | Feb. 4, 1936 |
| 1,777,849 | Hoopes | Oct. 7, 1930 |
| 2,269,168 | Ure | Jan. 6, 1942 |
| 2,201,182 | Kelley | May 21, 1940 |
| 2,214,504 | Lux | Sept. 10, 1940 |
| 1,878,628 | Foster | Sept. 20, 1932 |
| 1,948,236 | King | Feb. 20, 1934 |
| 1,933,183 | Peterson | Oct. 31, 1933 |
| 2,224,887 | Van Hammersveld | Dec. 17, 1940 |
| 2,307,428 | Staples | Jan. 5, 1943 |
| 1,696,623 | Carhart | Dec. 25, 1928 |
| 2,190,208 | Green | Feb. 13, 1940 |
| 2,090,262 | Montgomery | Aug. 17, 1937 |
| 1,299,883 | Warren | Apr. 18, 1919 |
| 2,343,914 | Lloyd | Mar. 14, 1944 |
| 1,615,643 | Mickey | Jan. 25, 1927 |

FOREIGN PATENTS

| Number | Country | Date |
| --- | --- | --- |
| 125,532 | Swiss | Apr. 16, 1928 |